Nov. 27, 1962

J. S. PAGE 3,065,794

RETRIEVABLE WELL FLOW CONTROL VALVE

Filed Aug. 19, 1957

JOHN S. PAGE
INVENTOR.

BY Paul A. Weilein
ATTORNEY.

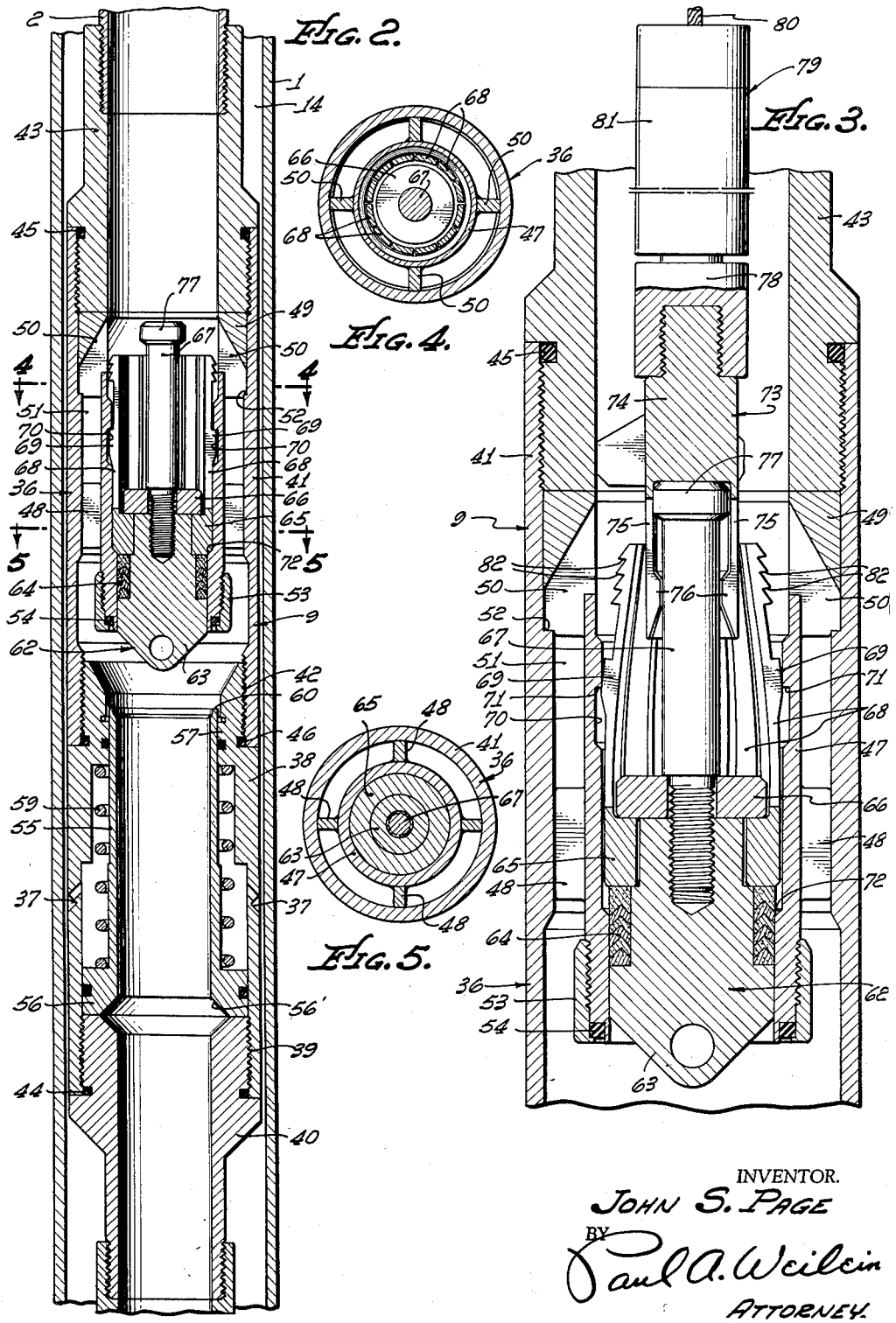

Nov. 27, 1962

J. S. PAGE 3,065,794

RETRIEVABLE WELL FLOW CONTROL VALVE

Filed Aug. 19, 1957

INVENTOR.
JOHN S. PAGE
BY
Paul A. Weilein
ATTORNEY.

United States Patent Office 3,065,794
Patented Nov. 27, 1962

3,065,794
RETRIEVABLE WELL FLOW CONTROL VALVE
John S. Page, Long Beach, Calif., assignor to Page Oil Tools, Inc., Long Beach, Calif., a corporation of California
Filed Aug. 19, 1957, Ser. No. 678,874
11 Claims. (Cl. 166—125)

The present invention relates to means for controlling the flow of production fluids from an oil and/or gas well, and more particularly to a novel and improved flow control valve.

Stated more specifically, the invention contemplates a sub-surface flow control valve for wells, said valve being fluid pressure actuated, and including an end seal type axially movable valve, with attendant sealing advantages, while when open, maintaining provision for full flow through the valve assembly.

In my copending application, Serial No. 669,043 filed July 1, 1957, there are disclosed a novel method and apparatus for shutting off the flow of well fluids upon any number of circumstances which may result in a drop in fluid pressure in the annulus above a packer between the tubing and casing, and including a fluid pressure responsive valve assembly disposed in the tubing above such packer.

An object of the present invention is to provide a novel and improved valve assembly for use in the performance of the method of the aforesaid application as a part of apparatus as disclosed and claimed in that application.

Another object is to provide a novel valve construction according to the preceding object which is particularly advantageous where the production volume or barrels of oil per day is a significant factor. In accordance with this objective, the valve of this invention is so constructed that, for example, when employed in a well cased with 7 inch casing, the tubing valve has a by-pass or flow area equal to approximately 3½ inches, whereas in the case of valves such as shown in the aforementioned application the maximum valve flow area, consistent with the retention of the other desirable features of the valve, is approximately 3 inches. Thus, for a given casing and tubing size it will be noted that a substantially increased production volume is possible through the instant valve. This is a particularly desirable characteristic inasmuch as in some areas numerous wells are cased with 7 inch casing, thus imposing serious limitations of tubing and flow control valve dimensions.

Another object is to provide a flow control valve assembly which is extremely simple in its manufacture and assembly and includes portions which are readily removable for service or repair, particularly for replacement of a resilient valve seat element. A further feature in accordance with this objective is the provision of a retrievable plug which, when in place, cooperates with the valve assembly in shutting off the flow of fluid through the valve, but which, when removed, affords substantially a full tubing size opening through the valve assembly. This enables the performance of certain through tubing, down hole wire line operations, without necessitating pulling of the tubing.

Another object is to provide a retrievable plug type valve assembly as aforesaid in combination with a setting tool having means providing a jar for facilitating setting of the plug. In addition, a retrieving tool is also adapted to be engaged with the plug to remove the same, the retrieving tool also having means providing a jar for facilitating removal of the plug. The setting and retrieving tools are both adapted for connection to a wire line so that the plug may be easily run in and removed on the wire line.

Another object is to provide a valve assembly for use in a tubing string to control the flow of fluid therethrough, said valve including a seat, and an axially movable sleeve having an end face adapted for sealing contact with said seat, said sleeve having means defining with a housing for the assembly, a fluid pressure actuator chamber communicating through the housing with the exterior of the housing so as to be subjected to fluid pressure in the annulus or from some other source.

Other objects and advantages will hereinafter be described or will become apparent to those skilled in the art, and the novel features of the invention will be defined in the appended claims.

In the accompanying drawings:

FIG. 2 is an enlarged detail view in section, with certain of the parts shown in elevation, of a valve made in accordance with the invention, the valve being open;

FIG. 3 is a fragmentary view in vertical section on an enlarged scale, showing a setting tool in combination with the retrievable plug;

FIG. 4 is a view in transverse section, as taken on the line 4—4 of FIG. 2;

FIG. 5 is a view in transverse section as taken on the line 5—5 of FIG. 2;

Like reference characters in the several views of the drawings and in the following detailed description designate corresponding parts.

Figure 1:
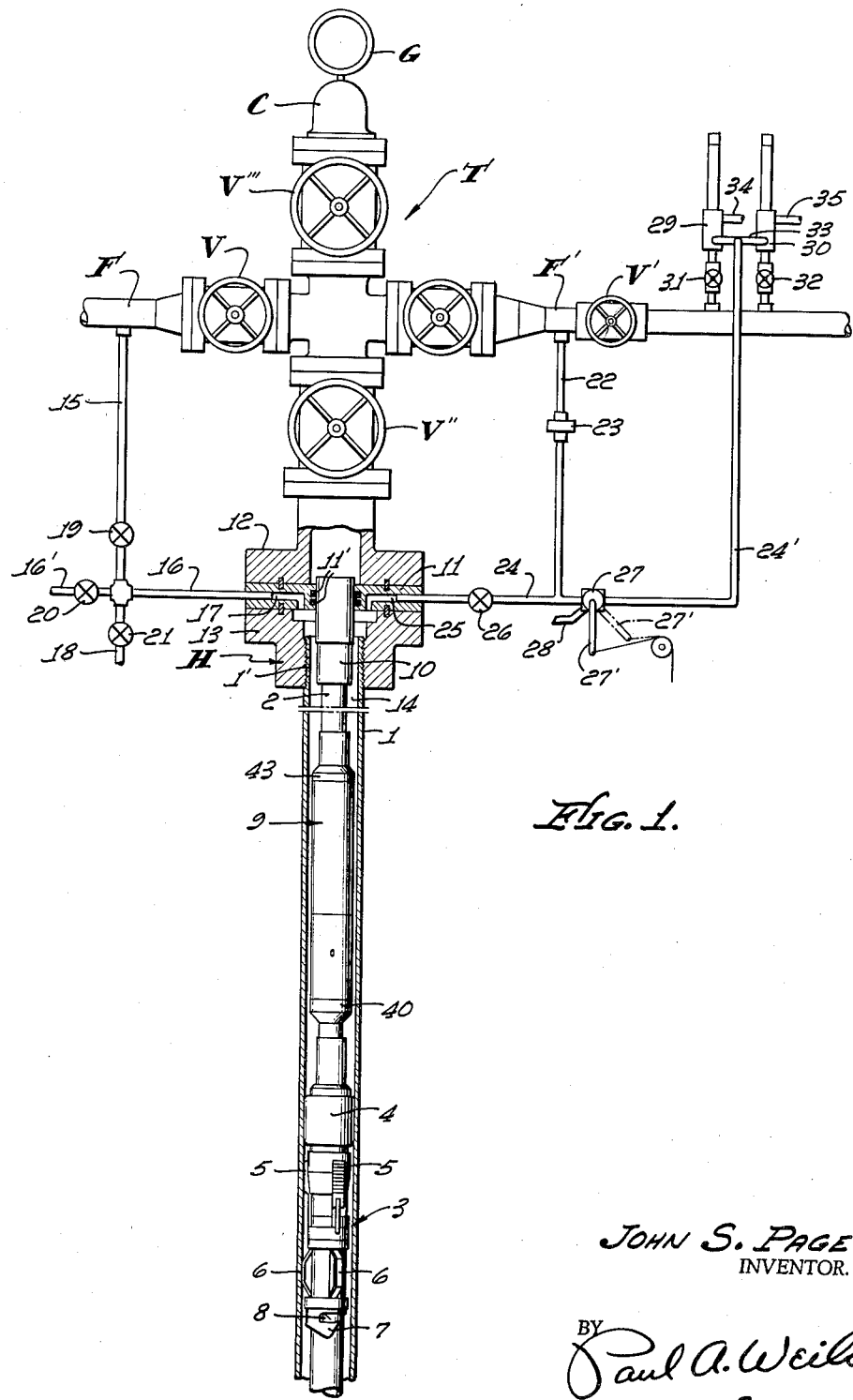
FIG. 1 is a diagrammatic view showing well head equipment, together with casing and tubing strings extending downwardly into a well, and a valve assembly in the tubing embodying the present invention.

Referring particularly to FIG. 1, well apparatus is shown, including a casing 1 disposed in a well, with a tubing string 2 concentrically disposed in the casing. The tubing may be suspended in the casing at a point spaced substantially downwardly from the top of the casing by suitable means such as a tubing anchor (not shown). Above the anchor is a suitable packer. A hook-wall packer assembly 3 may be advantageously used, thus eliminating the need for a separate anchor in some cases. The hook-wall packer 3 need not be described in detail in that it is a known type of packer. Generally, however, the packer assembly 3 includes a packer element 4 adapted to seal off the annulus between the casing and the tubing. Means such as a plurality of casing wall engaging slips 5 are employed for securing the packer in place. Operatively connected to the slips 5 is a plurality of friction pads 6 engageable with the casing to set the slips 5 and prevent relative movement of the packer assembly 3 and the tubing 2 in one direction. Depending from the packer assembly is a suitable number of hooks 7 adapted for engagement with a similar number of lugs 8 carried by the tubing 2, whereby relative movement of the packer assembly 3 and the tubing 2 in the other direction, is precluded.

Interposed in the tubing string 2 between the hook-wall packer assembly 3 and the upper end of the tubing is a novel fluid pressure operated valve assembly generally designated 9 which will be more specifically described as the description progresses.

As previously noted, the valve assembly is adapted to be subjected to fluid pressure. Such pressure is preferably derived from the production fluid through well head equipment. This well head equipment includes a safety landing sub 10 carried by the upper end of the tubing string 2. Removably mounted on the upper end of the landing sub 10 as by a slip fit is an annular landing flange 11 which is interposed between upper and lower sections 12 and 13, respectively, of casing head means generally designated H. At its inner periphery, the landing flange is provided with suitable seals or packing rings 11' so that the landing flange constitutes an upper barrier between the casing 1 and tubing 2 for preventing the direct flow of fluid from the tubing into the casing. In addition, casing head section 13 is sealingly engaged at the upper extremity of casing 1 as by a threaded connection 1'.

Disposed above the casing head H is a conventional Christmas tree T having flow lines F, F' each having a flow valve V and V', respectively. The Christmas tree T also comprises a valve V'' between the casing head H and the flow lines F, F' and a valve V''' disposed above the flow lines F, F'. At the top of the Christmas tree is a cap C which may advantageously be fitted with a guage G or the like.

In accordance with the invention hereof, the fluid pressure operated valve assembly 9 is adapted to be maintained open, that is, in a condition enabling the well to flow or produce through the tubing 2, responsive to fluid pressure in the annulus 14 between the casing 1 and the tubing 2. Such fluid pressure may be derived from a number of sources.

For example, in FIG. 1, fluid communication is established between the flow lines F, F' and the annulus 14. In this connection, a line 15 is tapped into the flow line F. This line 15 is joined with a line 16 which is connected with the landing flange 11, the landing flange having a passage 17 leading to the annulus 14. In addition, the line 16 is extended as at 16' for connection to a pump or other source of pressure fluid (not shown), and a vent line 18 is also connected to the line 16. Each of the lines 15, 16' and 18 is provided with a control valve, such valves being respectively designated 19, 20 and 21.

At the other side of the Christmas tree T and communicating with the flow line F' is a pressure line 22 preferably having an orifice union 23 therein for limiting the rate of flow of fluid from the flow line F'. The line 22 is connected with a line 24 which establishes fluid communication with the annulus 14 through a passage 25 in the landing flange 11.

The line 24 has a manual valve 26 and a multiway valve 27 therein. The multiway valve 27 is adapted to selectively establish communication between the line 24 and a vent 28 and between the line 24 and an extension 24' of the latter, the flow from line 24 to extension 24' being interrupted by the valve 27 upon venting of the line 24. Valve 27 may be of any desired construction but is preferably operable by a lever 27' for a purpose which will be hereinafter more fully described.

Also connected to flow line F' is a pair of pilot valves 29 and 30, a manual valve preferably being interposed between each pilot valve 29 and 30 as at 31 and 32, respectively, and the line F'. A cross line 33 establishes communication between the line 24' and the pilot valves 29 and 30, and each of said pilot valves is provided with a vent 34 and 35, respectively. The details of the pilot valves are not germane and they may be of any desired construction, whereby one of the pilot valves, say pilot valve 29, is responsive to a drop in pressure in the line F' below a predetermined value to vent line 24' to the atmosphere through vent 34, whereas the other pilot valve 30 is responsive to pressure in line F' above a predetermined value to vent line 24' through vent 35.

As has been previously stated, the valve assembly 9 is adapted to be maintained open responsive to fluid pressure in the annulus 14. Accordingly, the valve assembly 9 includes a cylindrical housing 36 having a suitable number of ports 37 leading from the annulus 14 into the housing.

Figure 6:
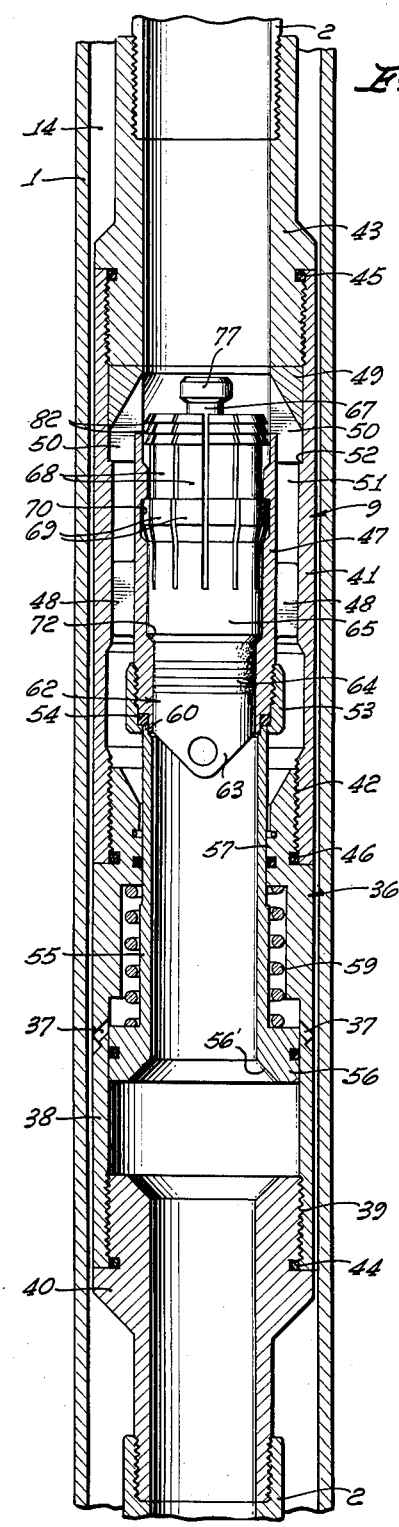
FIG. 6 is a view similar to FIG. 2, but showing the valve closed.

Referring particularly to FIGS. 2 and 6, it will be seen that the housing 36 preferably includes a lower section 38 constituting a pressure cylinder and threadedly connected as at 39 with a coupling 40 adapted to be connected with the depending tubing string. An upper housing section 41 is threaded to the lower section 38 as at 42, and at its upper end the housing section 41 is threaded to a coupling 43 adapted to be connected to the tubing string above the valve 9. Suitable sealing means are employed for preventing the passage of fluid between the couplings 40 and 43 and the ends of the housing sections 38 and 41, respectively, such as O-ring or other sealing elements 44 and 45. Another sealing element or O-ring 46 is interposed between the threaded ends of the housing sections at the connection 42 thereof.

The upper housing section 41 has mounted therein a generally cylindrical member 47 having a plurality of radially projecting webs 48 adjacent its lower end and engaged with the inner surface of the housing section 41. At its upper end, the member 47 has a supporting collar 49 joined thereto by a plurality of webs 50. A flow passage 51 is defined between the member 47 and the housing section 41, this flow passage establishing communication between the upper end of the housing section 41 and the space below the member 41. The collar 49 shoulders against the lower end of coupling 43, and each of the webs 50 abuts on a shoulder 52 formed on the inner periphery of the housing section 41. Preferably the flow passage 51 has a cross sectional area which is equal to or greater than the cross sectional flow area of the tubing in which the assembly 9 is installed. At its lower extremity, the member 47 threadedly receives a collar 53 for retaining a resilient ring or valve seat element 54 in an end seat in the member 47.

Reciprocably disposed in the lower housing section 38 is a fluid pressure actuated valve sleeve 55 (see FIGS. 2 and 6). The sleeve 55 has a radial flange 56 at its lower end engageable with the inner periphery of the housing section 38, while the latter has a radially inwardly projecting internal flange 57 engaged with the outer periphery of the sleeve 55. Accordingly, the sleeve 55 is concentrically supported in the housing section 38 for axial movement.

In order to effect such axial movement, the ports 37 previously referred to establish communication between the annulus 14 and the fluid pressure chamber defined between the sleeve 55 and the housing section 41. When the annulus is pressurized, therefore, the sleeve 55 will be moved downwardly by such pressure inasmuch as the flange 56 constitutes a fluid pressure responsive actuator head. In addition, a coiled compression spring 59 is interposed between the flanges 56 and 57 and normally tends to bias the sleeve downwardly. At its upper extremity the sleeve 55 is provided with a valve seat engaging end portion 60 adapted to sealingly engage the valve seat 54 previously referred to so as to shut off the flow of fluid through the by-pass or flow passage 51.

It will be noted that the cylindrical member 47 is hollow, having an axial opening therethrough, in which is removably disposed a plug 62 adapted to close off the opening through member 47 and to be retrieved therefrom so as to permit the performance of wire line operations, without necessitating removal of the entire valve assembly. The plug 62 comprises an elongated circular body 63 provided with suitable packing rings such as chevron seals 64 about its outer periphery for sealing contact with the opposing inner periphery of member 47. Seal rings 64 are retained in place by an annular collar 65 which is disposed about the upper extremity of the plug body 63 and removably secured thereto as by an annular washer 66 which overlies the collar 65. An elongated bolt or pin 67 having a threaded end projects through the washer 66 into threaded engagement with the plug body 63, the bolt or pin 67 shouldering on the washer. The washer 66 is provided with a plurality of upwardly extended spring fingers or detents 68, each having an outstanding ear or lug 69 thereon adapted for engagement in a correspondingly formed annular groove 70 in the inner periphery of member 47. The notch 70 affords an upper radial shoulder 71, whereby when the lugs 69 on the fingers 68 are disposed in such slot, the coengaged radial upper end of the lugs 69 will retain the plug 62 in place in the member 47, with a radially extended portion of the collar 65 shouldering on a shoulder 72 in the member 47.

In order to set the plug 62 in the member 47 from the surface while the valve assembly, less plug 62, is installed in a tubing string some distance down in a well, a setting tool generally designated 73 is provided, as seen in FIG. 3. Such setting tool includes a body 74 having a plurality of depending spring fingers 75. These fingers 75 are provided with inwardly projecting ears or lugs 76 adapted to engage beneath an enlarged head 77 on the upper end of the bolt or pin 67. Threadedly secured to the body 74 of the setting tool 73 is a base element 78 of a jar assembly 79. This base element has shiftably supported thereon a jar member 81 which enables an impact to be imparted to the setting tool body 74 and thence through pin 67 to plug body 63 to effect proper seating of the latter. A wire line 80 is secured to the jar member 81 so that the setting tool 79 with a plug supported by the lugs 76 of the setting tool, may be lowered into the member 47.

As the plug is set in the member 47, the lugs 69 will cam inwardly until they register with the slot 70, whereupon the lugs 69 will lock beneath the shoulder 71. Thereafter, the setting tool may be pulled out of the tubing, the gripping fingers 75 being forced to cam over head 77 of pin 67 and thus release the plug.

As previously described, the plug 62 is adapted to be retrieved from the valve assembly, and accordingly, means are provided for this purpose. In this connection, the upper extremities of spring fingers 68 on the collar 65 of the plug 62 are provided with a series of downwardly inclined teeth or projections 82 adapted for engagement by complemental upwardly inclined projections or teeth 83 provided on a hollow downwardly extended skirt 84 of a body member 85 of a retrieving tool generally designated 86 and shown in FIG. 7. The retrieving tool 86 also includes a jar comprising a base member 87 threadedly secured to the body 85 and a movable jar element 88 for imposing an impact on base 87 upon downward movement of the element 88.

Figure 7:
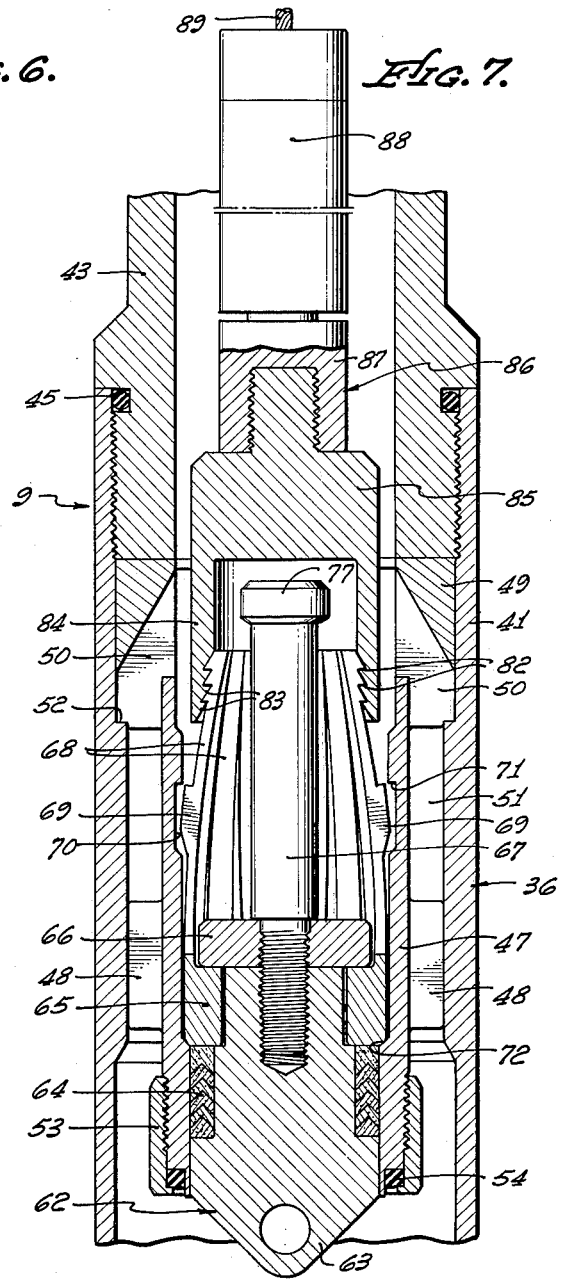
FIG. 7 is a view similar to FIG. 3, but showing a retrieving tool in combination with the retrievable plug.

It will be apparent that the retrieving tool skirt 84 will engage the fingers 68 of the plug 62 and teeth 83 on the former, engaging teeth 82 on the latter, will retract the fingers 68 to the position shown in FIG. 7 from the plug locking position shown in FIGS. 2 and 6, and the plug will be free for removal from the valve assembly.

When the plug 62 is seated, production fluid will pass through bypass passage 51 and flow through the tubing 2, thus subjecting the annulus 14 to the pressure thereof through the well head equipment previously described, as is more particularly pointed out in my copending application above referred to. Such pressure will act upon the valve sleeve 55 to maintain the latter in the position shown in FIG. 2, in conjunction with the spring 59. The lower extremity of the sleeve 55, however, is provided with a production fluid pressure responsive area 56', which, upon the occurrence of any event whereby the annulus pressure is reduced, will effect production fluid pressure responsive movement of the sleeve 55 to the position shown in FIG. 6, so that the valve will be closed, in accordance with the method disclosed in my aforementioned pending application.

In this connection, when the well is flowing, the valve V''' will be closed off, while production fluid passes through either or both of flow lines F and F' through flow valves V and V'. Assuming that flow is passing through both of lines F and F', valve 20 in line 16' will be closed off, as will be vent valve 21 and vent 28 through multi-way valve 27, but valves 19, 26, 31 and 32 will be open. Accordingly, pressure from the production fluid will be imposed on fluid in the annulus 14 and in the chamber between valve sleeve 55 and housing section 38.

As long as the well is producing normally under predetermined pressure, vents 34 and 35 of under and over pressure pilot valves 29 and 30 will remain closed. However, should production pressure exceed or fall below the pressure which the pilot valves are set for, flow between line 24 and flow line F' will automatically be vented to the atmosphere. This will relieve fluid pressure in the annulus 14 and the annular valve space between the sleeve 55 and the lower housing section 38; whereupon the further flow of production fluid will act upon lower end surface 56' of sleeve 55, thus shifting the sleeve 55 to the position of FIG. 6 to close the valve.

Accordingly, the well is automatically shut in upon excessive or diminished flow pressures. The same result may be accomplished by opening vent valve 21 which will relieve the fluid in the annulus 14 from production pressure. Thus, manual flow control is effected.

Of course, in the event that the casing head H, which has a slip fit with the casing and tubing should be inadvertently separated from the casing as by reason of a collision of some object with the platform or with the well head equipment, or in the absence of an over pressure pilot valve such as that indicated at 30, should be blown off, the pressure in the annulus will also be reduced. Thereupon, the valve 9 will function as a subsurface blowout preventer.

It will now be apparent, that, in accordance with the objectives stated at the commencement hereof, the invention provides means for shutting off well flow, which comprises, broadly, a fluid pressure responsive valve disposed in a tubing string and adapted to be closed by production fluid pressure, said valve communicating with the annulus between the tubing and well casing above a packer; whereby upon pressurizing the annulus above the packer the valve will be opened, and upon depressurizing the annulus responsive to one or more of a number of different occurrences at the well head, the valve will be closed and prevent further flow. These occurrences at the well head, as has been previously mentioned, may be purely manual, as in the case of opening vent valve 21, or on the other hand, such occurrences may be automatic such as blowing off of the well head, opening of over or under pressure vents, opening of a vent responsive to collision or the like.

While the specific details of the invention have been herein shown and described, changes and alterations may be resorted to without departing from the spirit of the invention.

I claim:

1. A flow control vale for wells, comprising: a housing adapted to be installed in a tubing string in a well; said housing having a flow passage therethrough; a tubular member supported in said housing and having a central opening therethrough coaxial with said flow passage and defining with said housing a by-pass therebetween; said member having a valve seat at one end; a valve sleeve shiftably disposed in said housing in seating engagement therewith for movement into and out of seating engagement with said valve seat to selectively close off and open said by-pass; means for shifting said valve sleeve; and a plug removably disposed in the central opening aforesaid.

2. A flow control value for wells, comprising an elongate housing adapted to be installed in a tubing string in a well; said housing having a flow passage extending longitudinally therethrough; valve means disposed in said flow passage for controlling the flow of fluid through said passage; said valve means including a member having an annular valve seat thereon; said member having an opening therethrough substantially as large as said flow passage through said housing; means removably connected to said member in said opening for closing the latter; said member being supported in said housing and spaced from said housing to provide a by-pass between the housing and the member; a valve sleeve shiftably disposed in said flow passage for movement into and out of engagement with said seat to selectively close off and open said by-pass; fluid pressure responsive means for shifting said valve sleeve as aforesaid; said last-mentioned means including a pressure head on said sleeve, said pressure head having a surface disposed in the path of fluid flow through said flow passage and being slidably and sealingly engaged with said housing; and said housing having a portion extending inwardly into sealing engagement with said sleeve in spaced relation to said pressure head to seal off a portion of said pressure head opposed to said surface from the effect of fluid in said flow passage.

3. A flow control valve for wells, comprising an elongate housing adapted to be installed in a tubing string in a well; said housing having a flow passage extending longitudinally therethrough; valve means disposed in said flow passage for controlling the flow of fluid through said passage; said valve means including a member having an annular valve seat thereon; said member having an opening therethrough substantially as large as said flow passage through said housing; means removably connected to said member in said opening for closing the latter; said member being supported in said housing and spaced from said housing to provide a by-pass between the housing and the member; a valve sleeve sealed to said housing and shiftably disposed in said flow passage for movement into and out of engagement with said seat to selectively close off and open said by-pass; fluid pressure responsive means for shifting said valve sleeve as aforesaid; said last mentioned means including means defining between said sleeve and said housing a fluid pressure chamber and including a pressure responsive piston on said sleeve.

4. A flow control valve for wells, comprising an elongate housing adapted to be installed in a tubing string in a well; said housing having a flow passage extending longitudinally therethrough; valve means disposed in said flow passage for controlling the flow of fluid through said passage; said valve means including a member having an annular valve seat thereon; said member having an opening therethrough substantially as large as said flow passage through said housing; means removably connected to said member in said opening for closing the latter; said member being supported in said housing and spaced from said housing to provide a by-pass between the housing and the member; a valve sleeve sealed to said housing and shiftably disposed in said flow passage for movement into and out of engagement with said seat to selectively close off and open said by-pass; fluid pressure responsive means for shifting said valve sleeve as aforesaid; said last mentioned means including means defining between said sleeve and said housing a fluid pressure chamber and including a pressure responsive piston on said sleeve and spring means normally biasing said sleeve away from said seat.

5. A flow control valve for wells, comprising a housing adapted to be installed in a tubing string in a well; said housing having a flow passage therethrough; valve means disposed in said flow passage for controlling the flow of fluid through said passage; said valve means including a member having an annular valve seat thereon; said member being supported in said housing and spaced from said housing to provide a by-pass between the housing and the member; a valve sleeve sealed to said housing and shiftably disposed in said flow passage for movement into and out of engagement with said seat to selectively close off and open said by-pass; and means for shifting said sleeve as aforesaid; said member having a central opening therethrough; and a plug removably disposed in said opening.

6. A flow control valve for wells, comprising a housing adapted to be installed in a tubing string in a well; said housing having a flow passage therethrough; valve means disposed in said flow passage for controlling the flow of fluid through said passage; said valve means including a member supported in said housing and having an annular valve seat thereon; said member being spaced from said housing to provide a by-pass between the housing and the member; a valve sleeve sealed to said housing and shiftably disposed in said flow passage for movement into and out of engagement with said seat to selectively close off and open said by-pass; and means for shifting said sleeve as aforesaid; said member having a central opening therethrough; and a plug removably disposed in said opening; said plug and said member having coengaged means for releasably securing said plug in said opening.

7. A flow control valve for wells, comprising a housing adapted to be installed in a tubing string in a well; said housing having a flow passage therethrough; valve means disposed in said flow passage for controlling the flow of fluid through said passage, said valve means including a member supported in said housing and having an annular valve seat thereon; said member being spaced from said housing to provide a by-pass between the housing and the member; a valve sleeve sealed to said housing and shiftably disposed in said flow passage for movement into and out of engagement with said seat to selectively close off and open said by-pass; means for shifting said sleeve as aforesaid; said member having a central opening therethrough; a plug removably disposed in said opening; said plug having a resilient member thereon engageable with the member aforesaid; one of said members being provided with a recess; and the other of said members having a projection engageable in said recess for retaining said plug in said opening.

8. A flow control valve for wells, comprising a housing adapted to be installed in a tubing string in a well; said housing having a flow passage therethrough; valve means disposed in said flow passage for controlling the flow of fluid through said passage, said valve means including a member supported in said housing and having an annular valve seat thereon; said member being spaced from said housing to provide a by-pass between the housing and the member; a valve sleeve sealed to said housing and shiftably disposed in said flow passage for movement into and out of engagement with said seat to selectively close off and open said by-pass; means for shifting said sleeve as aforesaid; said member having a central opening therethrough; a plug removably disposed in said opening; said plug having a plurality of axially extended resilient fingers thereon; said fingers each having a projection thereon; and said member having a recess providing a shoulder interlockingly engageable with said projections for retaining said plug in said opening.

9. A flow control valve for wells, comprising: a housing adapted to be disposed in a tubing string extending into the well; valve means in said housing; means for actuating said valve means to establish and interrupt the flow of fluid through said tubing string; said valve means including a stationary valve member in said housing and providing an opening coaxial with said tubing string for enabling the unrestricted passage of a device down into the well through the tubing string; means providing a by-pass passage around said member; a sleeve slidable in said housing and having an opening coaxial with the opening in said valve member and a plug removably disposed in and bridging said opening in said valve member; said valve member and said plug having means for automatically connecting said plug to said valve member upon insertion of the plug into said opening; said connecting means including a member on said plug complemental to said valve member; one of said members having a plurality of longitudinally extended resilient fingers connected at one end to the latter member and free at their other end;

said fingers having a projection; and the other member having a recess forming a shoulder engageable by said projection to latch said plug in said valve member.

10. A flow control valve as defined in claim 9 wherein said spring fingers are connected to said plug member and are provided with outwardly projecting teeth having inclined surfaces engageable by complemental teeth of a retrieving tool adjacent the free ends of said fingers to deflect the projections in said fingers out of engagement with said shoulder.

11. A flow control valve as defined in claim 9 wherein said plug is provided with a stem extending longitudinally beyond the free ends of said spring fingers and having an enlarged head providing a shoulder engageable by a setting tool.

References Cited in the file of this patent

UNITED STATES PATENTS

| | | |
|---|---|---|
| 2,196,664 | Kofahl | Apr. 9, 1940 |
| 2,219,408 | Benz et al. | Oct. 29, 1940 |
| 2,248,305 | Rasmussen | July 8, 1941 |
| 2,554,390 | Stevenson | May 22, 1951 |
| 2,676,661 | Crooke | Apr. 27, 1954 |
| 2,698,056 | Marshall et al. | Dec. 28, 1954 |
| 2,813,588 | O'Reilly | Nov. 19, 1957 |
| 2,872,238 | Daffin | Feb. 3, 1959 |

FOREIGN PATENTS

| | | |
|---|---|---|
| 774,783 | Great Britain | May 15, 1957 |
| 774,785 | Great Britain | May 15, 1957 |